(12) United States Patent
Ricks et al.

(10) Patent No.: US 6,421,234 B1
(45) Date of Patent: Jul. 16, 2002

(54) HANDHELD ELECTRONICS DEVICE HAVING ERGONOMIC FEATURES

(75) Inventors: Jeffery D. Ricks, Logan; Gary D. Spence, Mendon; Ronald H. Campbell, Mendon, all of UT (US)

(73) Assignee: Juniper Systems, Inc., North Logan, UT (US)

( * ) Notice: Subject to any disclaimer, the term of this patent is extended or adjusted under 35 U.S.C. 154(b) by 0 days.

(21) Appl. No.: 09/686,337

(22) Filed: Oct. 10, 2000

(51) Int. Cl.$^7$ ................................................ G06F 1/16
(52) U.S. Cl. .................. 361/683; 361/379; 361/383; 361/386; 361/729; 361/731; 235/462; 235/472; 710/12; 378/428
(58) Field of Search ................... 361/679–681, 361/683, 686, 729, 731; 364/708.1, 709.01; 235/462, 472; 710/12, 64, 67; 379/428, 433, 434

(56) References Cited

U.S. PATENT DOCUMENTS

| | | | |
|---|---|---|---|
| 5,768,370 A | * | 6/1998 | Maatta et al. ............... 379/433 |
| 5,801,918 A | * | 9/1998 | Ahearn et al. ............... 361/683 |
| 5,999,996 A | * | 12/1999 | Dunn ........................... 710/64 |

* cited by examiner

Primary Examiner—Darren Schuberg
Assistant Examiner—Yean-Hsi Chang
(74) Attorney, Agent, or Firm—Workman, Nydegger & Seeley

(57) ABSTRACT

Electronics devices having a housing with ergonomic features that enhance the ability of a user to hold the electronics devices for extended periods of time using different grips. The housing has a middle gripping region that is narrower than a top section and a bottom section positioned to either side of the gripping region. A keypad structure is positioned at the middle gripping section on a front surface of the housing. The back surface of the housing has a depression positioned generally at the midline of the housing. The depression engages the fingertips, the palm, or other portions of the hand when the user holds the electronics device. Rounded corners where the lateral surface of the housing meet the front surface and the back surface contribute to the user's comfort when holding the electronics device. The ergonomic features of the housing enable the user to conveniently hold the electronics device in any of a variety of grips, using one or two hands, and in which the fingers or palm of the hand or hands engage the depression.

17 Claims, 8 Drawing Sheets

HANDHELD ELECTRONICS DEVICE HAVING ERGONOMIC FEATURES

BACKGROUND OF THE INVENTION

1. The Field of the Invention

The present invention relates to portable electronics devices, such as handheld computers. Specifically, the present invention relates to portable electronics devices having an ergonomic shape that allows the devices to be easily held in one or two hands in a variety of positions.

2. The Prior State of the Art

During recent decades, electronics devices have become smaller, more lightweight, and more widely used in a variety of industries and endeavors. Early computers used vacuum tubes and other large-scale components and, accordingly, were large devices that were immovable fixtures and at times could fill an entire room. With the advent of liquid crystal displays, integrated circuits and silicon semiconductor chips, computers and other electronics devices have steadily increased in computing power and decreased in size.

In recent years, the demand for access to computing power, coupled with the significant decrease in computer size has yielded portable electronics devices, such as laptop computers, which enable users to carry computing resources that previously were limited to relatively fixed, desktop computers. Special-purpose computing and communication devices have also been developed, including digital personal assistants, cellular phones, global positioning system receivers, and any number of other electronics devices.

Fixed electronics devices, such as desktop computers, home entertainment equipment, and the like, are typically encased by rectangular or box-shaped housings. The shape of such housings has been selected for ease of manufacturing and to enable the electronics devices to be securely positioned in a stationary position, stacked, shipped, etc. As portable analogs to fixed electronics devices have become available, the portable devices typically have been given housings much like those of the fixed devices. Handheld electronics devices are generally rectangular in shape, often resulting in user discomfort when the devices are held for more than a short period of time. Thus, while a large number of handheld devices are being developed, the shape of their housings has limited the degree to which they can be continually used for long periods of time.

SUMMARY OF THE INVENTION

The present invention relates to housings of electronics devices that have ergonomic designs that allow the devices to be comfortably held by users in any of a variety of positions. The housing can be held by one or two hands, depending on the nature of the tasks that the user is performing while manipulating the electronics device. Moreover, the shape of the housings of the invention permit users to hold the devices for long periods of time without significant fatigue and discomfort.

According to one aspect of the invention, an electronics device that has the ergonomically shaped housing has a size that enables a user to hold the device in one or two hands. A gripping region of the housing is the portion of the housing that is gripped by the user when the user holds the electronics device. The housing has a front surface that is viewed and accessed by the user to enter information. Part of the ergonomic design is represented by the front surface being more narrow in a middle section associated with the gripping region than at the top or bottom section of the front surface. The narrow section can be conveniently and securely gripped by the user, while the relatively wider top section can include a screen of a display device.

Another feature of the ergonomic design of the gripping region is the rounding of the corners that are positioned where the front surface meets the lateral surfaces and where the back surface meets the lateral surfaces. Thus, when a user hold the electronics device, the hand is in contact with the rounded corners rather than more sharp corners. Yet another portion of the gripping region is a depression formed in near a midline of the back surface, into which the fingers or palm of the user's hand can rest.

A keypad structure can be formed on the narrow section of the front surface. Positioning the keypad structure at the narrow section causes the force applied to keys on the keypad structure to be directed toward the gripping structure and toward the hand of the user holding the electronics device. Thus, when the user repeatedly depresses keys, the torque applied to the electronics device and the hand gripping the housing is minimal, which can reduce stress or fatigue as the device is used.

A housing having the ergonomic features of the invention can be held in one of at least three ways. First, the user can grasp the gripping structure with one hand, with the upper portion of the palm positioned on the depression of the back surface, one or more fingers wrapped from the back surface to one adjacent lateral surface and the thumb wrapped from the back surface to the other adjacent lateral surface of the gripping portion. This position allows the user to view the display device and to have one hand free to enter information into the keypad structure or to engage in other activities.

Second, the user can grasp the gripping structure with one hand, with one or more fingers positioned on the depression of the back surface, the center portion of the palm positioned at an adjacent lateral surface, and thumb and associated portions of the palm being positioned at or near the front surface. This position permits the user to have one free hand and to manipulate the keypad with the free hand or with the thumb of the hand grasping the gripping section.

Third, the user can grasp the gripping structure with two hand positioned opposite one another. Each hand has fingers positioned on the depression of the back surface. Portions of the palms rest on the lateral surfaces of the gripping surface. Both thumbs are then available to access and manipulate the keypad structure. Using both thumbs enables faster keying of data than is possible using only one thumb. Other advantages of this position include the ability to hold the electronics device in a highly secure manner while entering data using the keypad structure.

Another ergonomic feature that can be used with the invention relates to the position of the screen of a display device that is located in the top section of the housing. Rather than being parallel to the plane defined by the keypad structure, the screen is tilted so that the direction normal to the screen angles toward the direction normal to the keypad structure. In other words, the screen can be tilted so that it is more readily viewable by the user. Without this positioning of the screen, the user may have to uncomfortably rotate the wrists to bring the screen into a position to be fully viewable.

Electronics devices having housings formed according to the invention can be held and used through long periods of time. Users are less likely to become fatigued as they use the electronics devices, making the electronics devices more valuable in a number of industries. The ability to switch between any of the three positions described above enables users to hold the electronics devices comfortably for any desired period of time.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to electronic devices having ergonomic features that allow devices to be held comfortably in any of a variety of positions. The housings include a depression formed on the back surface that engages either the fingers or a portion of the palm of the hand when the electronics device is held by a user. Rounded corners, particularly where the lateral surfaces of the housing meeting the back surface, and also where the front surface meets the lateral surfaces, contribute to the ease by which the electronics devices can be held. The housing can be held by one or two hands, depending on the nature of the tasks the user is performing while manipulating the electronics device.

The ergonomic features of the housings of the invention are described herein in the context of a handheld, portable computer. The handheld computer specifically disclosed herein represents handheld electronics devices in which the invention can be practiced. The housing with the ergonomic features of the invention can exist with or without the other novel features described in reference to the portable computer. An electronics device that has the ergonomic features disclosed herein can be comfortably held for long periods of time. When combined with the other features disclosed herein, an electronics device with the ergonomic features is also rugged and can be used and cleaned in harsh conditions.

Figure 1:
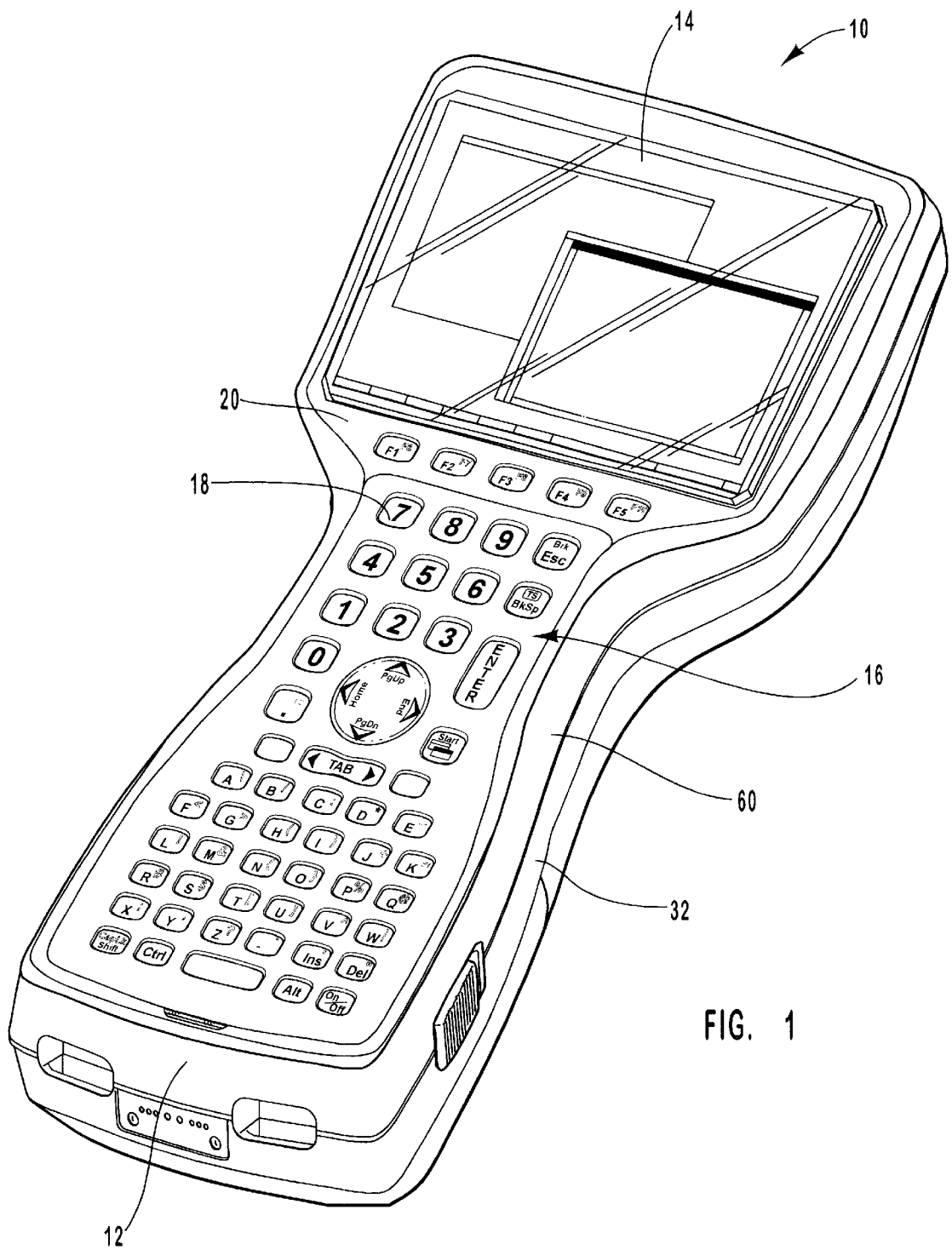
FIG. 1 is a perspective view of a handheld computer that includes the ergonomic features of the invention.

FIG. 1 is a perspective view of a handheld computer having the ergonomic features of one embodiment of the invention. The computer 10 has a housing 12 that encases the processing components of the computer and protects the computer from environmental conditions. Computer 10 has a display device, the screen of which is shown in FIG. 1 at reference number 14. A keypad structure 16 with alphanumeric keys 18 is positioned on the front surface 20 of housing 12. Computer 10 has ergonomic features, which will be disclosed in greater detail herein below, that assist users in holding computer 10 for extended periods of time without significant fatigue or discomfort. Accordingly, computer 10 can be used in ways that have not been previously feasible and permit users to more closely work with portable computing resources.

1. Ergonomic Features of Housing

Figure 2:
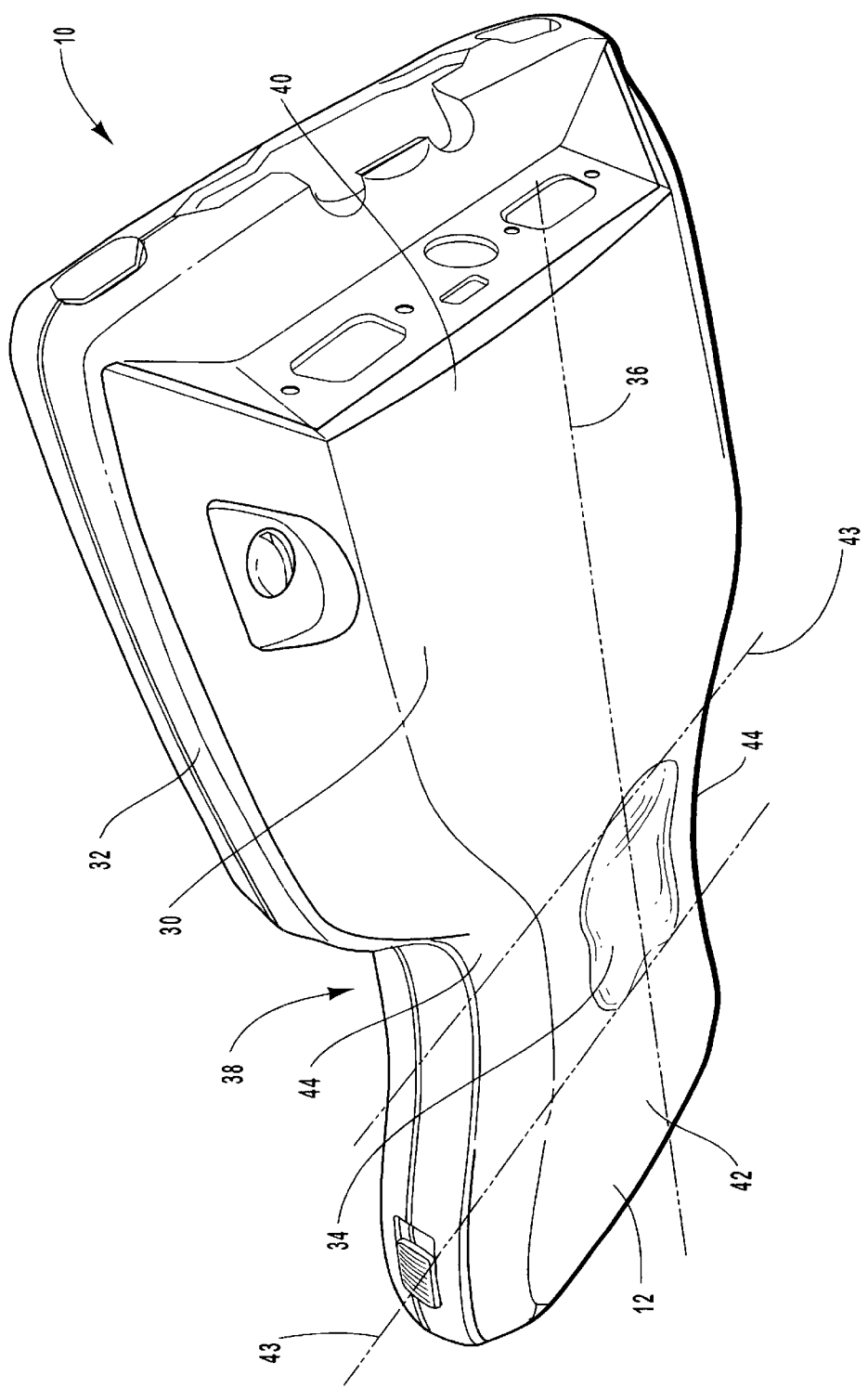
FIG. 2 is a back perspective view of the handheld computer of FIG. 1.

FIG. 2 is a back perspective view of computer 10 of FIG. 1, showing several of the ergonomic features of the invention that allow the computer to be held comfortably by a user. FIG. 2 illustrates a back surface 30 of housing 12 and lateral surface 32. Another later surface is positioned on an opposite side of housing 12 from lateral surface 32 shown in FIG. 2. As one part of the ergonomic features of the invention, back surface 30 has formed therein a shallow depression 34 for engaging the fingers portions of the palm of a hand of a user who holds computer 10. Depression 34 can take any of a variety of shapes, so long as the user's fingers or a portion of the palm can be received therein or can grip housing 12 in the depression. In the embodiment illustrated in FIG. 2, depression 34 has an oblong shape with the major axis aligned with the longitudinal axis of computer 10 and situated at the midline 36 of housing 12. A depression 34 having this position and shape enables the computer 10 to be held equally well with either hand and permits several fingers to potentially grip housing 12 within depression 34. In another embodiment, depression 34 takes the form of elongate channel formed on back surface 12 along midline 36, which also enables the fingers or the palm of the hand to grip the housing.

FIG. 2 also illustrates how housing 12 and the body of computer 10 can be described conceptually in terms of three regions or sections, which together form a unitary or integrated device. In particular, housing 12 can be described as having a middle gripping region 38 positioned between a top section 40 and a bottom section 42. As shown in FIG. 2, the conceptual boundaries between these portions 38, 40, and 42 can be generally defined by dotted lines 43, which are presented for illustration purposes. Middle gripping region 38 can be narrower than the adjacent top section 40 and bottom section 42, so that the user's hand does not tend to slip upwards or downwards away from gripping region 38.

Yet another ergonomic feature of this embodiment of the invention relates to rounded corners 44 at the portion of housing 12 where lateral surfaces 32 meet back surface 30. Rounded corners 44, in contrast to relatively sharp corners of housings found in other portable electronics devices, allow computer 10 to be comfortably held in a user's hand or hands for extended periods of time without causing discomfort.

Other ergonomic features, in addition to those described above in reference to FIG. 2, are illustrated in FIG. 1. For instance housing 12 can have rounded corners 60 where front surface 20 and lateral surface 32 meet. These rounded corners further enhance the comfort of the user when computer 10 is held for extended periods of time.

Figure 8:
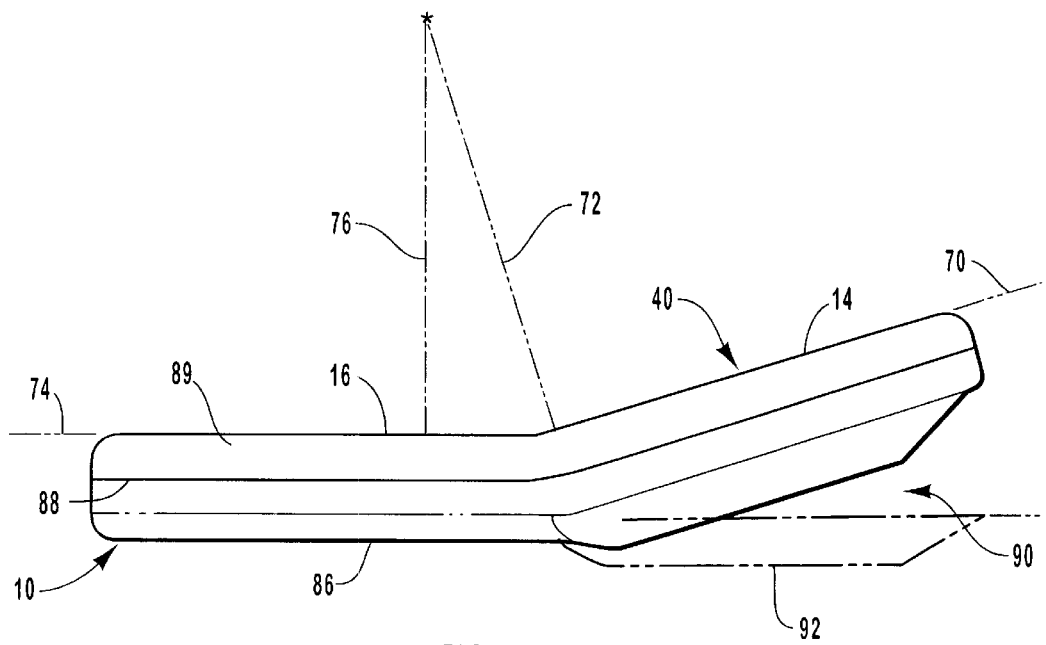
FIG. 8 is a side view of the handheld computer of FIG. 1, showing the angular position of the screen with respect to the keypad structure.

Another ergonomic feature of computer 10 according to one embodiment of the invention is the angular position of screen 14 with respect to the position of the remainder of front surface 20, as illustrated in FIG. 8, which is a side view of computer 10. In this embodiment, the screen, the position of which is indicated by reference number 14, defines a plane 70 and a line 72 normal thereto that extends away from screen 14. Similarly, the keypad structure, the position of which is indicated by reference number 16, defines another plane 74 and a line 76 normal thereto that extends away from the keypad structure 16. Rather than the plane 74 defined by keypad structure 16 and the plane 70 defined by screen 14 being coplanar or parallel, these two planes are angularly displaced relative to one another. Stated another way, the two normal lines 76 and 72 are nonparallel and can intersect one with another at a position above keypad structure 16.

The result of the geometry illustrated in FIG. 8 is that screen 14 is tilted upwards from the plane 74 defined by keypad structure 16 so that it can be more easily viewed by the user while the user hold computer 10. Positioning screen 14 in this manner avoids the situation where the user is required to repeatedly rotate the wrist as the user alternates between using keypad structure 16 and viewing screen 14. Moreover, the user can simultaneously view screen 14 and use keypad structure 16, with both being in a comfortable position.

Figure 3A:
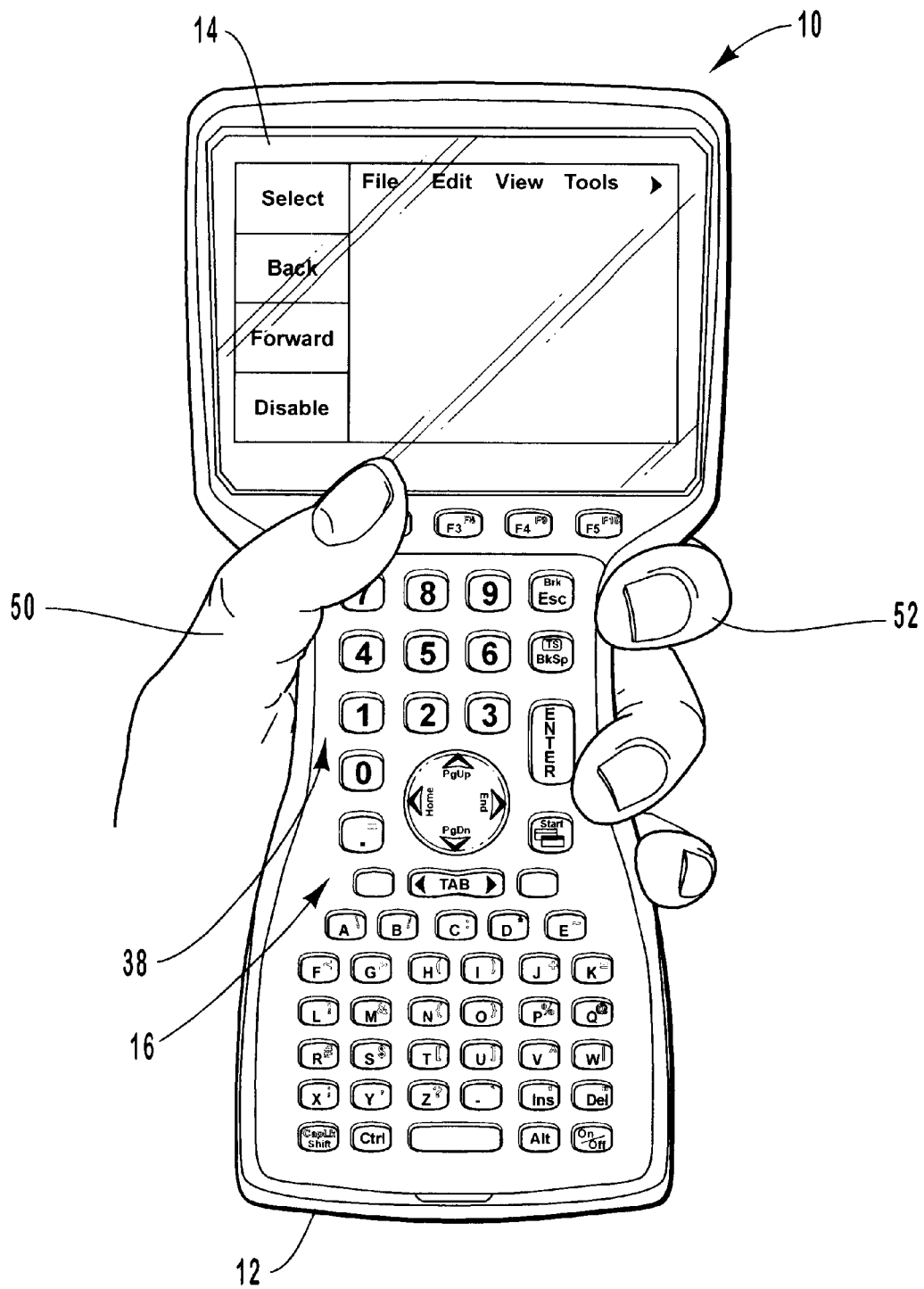
FIG. 3A shows a user holding the handheld computer of FIG. 1 using one hand in a first grip.
Figure 3B:
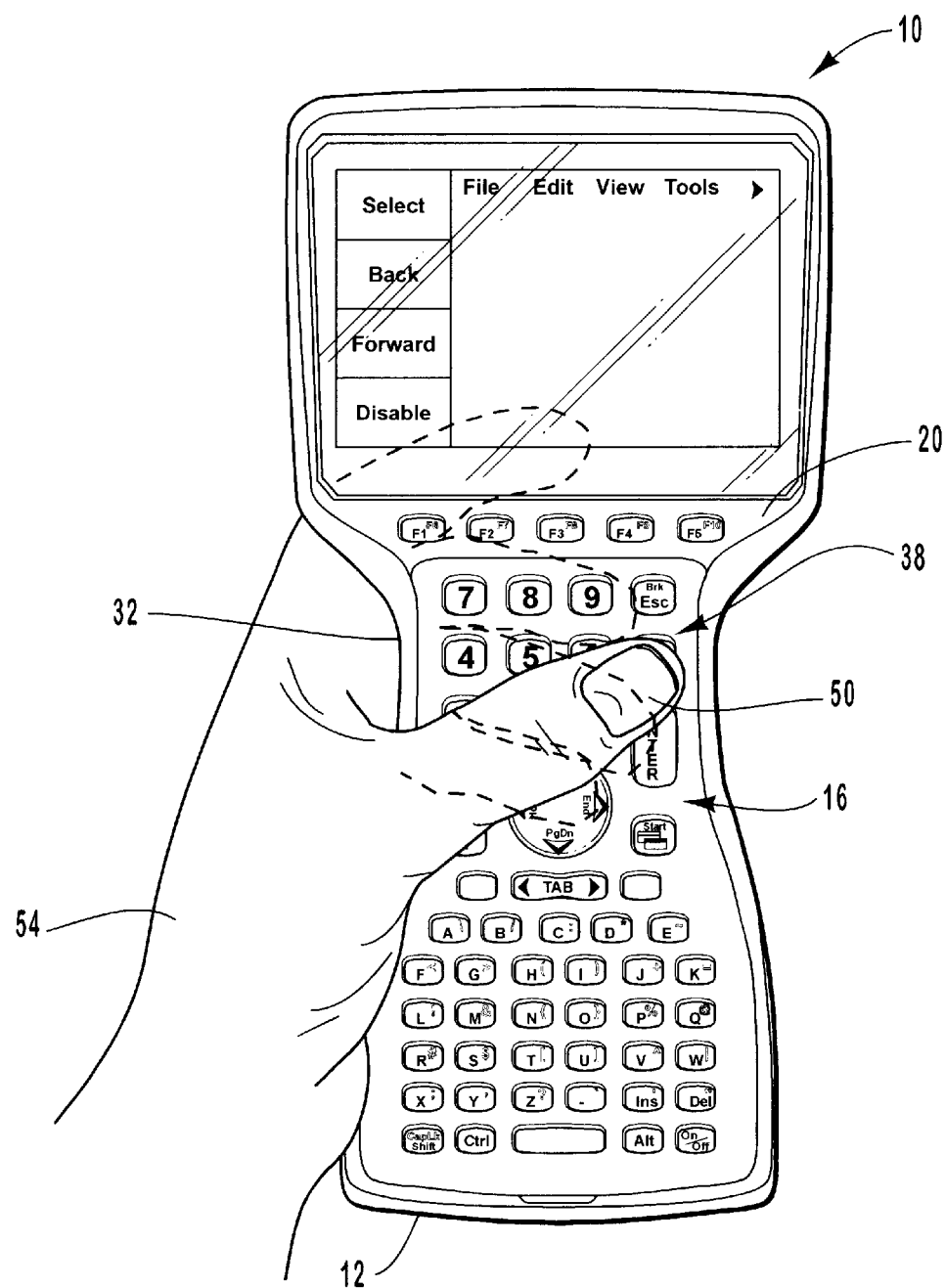
FIG. 3B illustrates a user holding the handheld computer of FIG. 1 using one hand in a second grip.
Figure 3C:
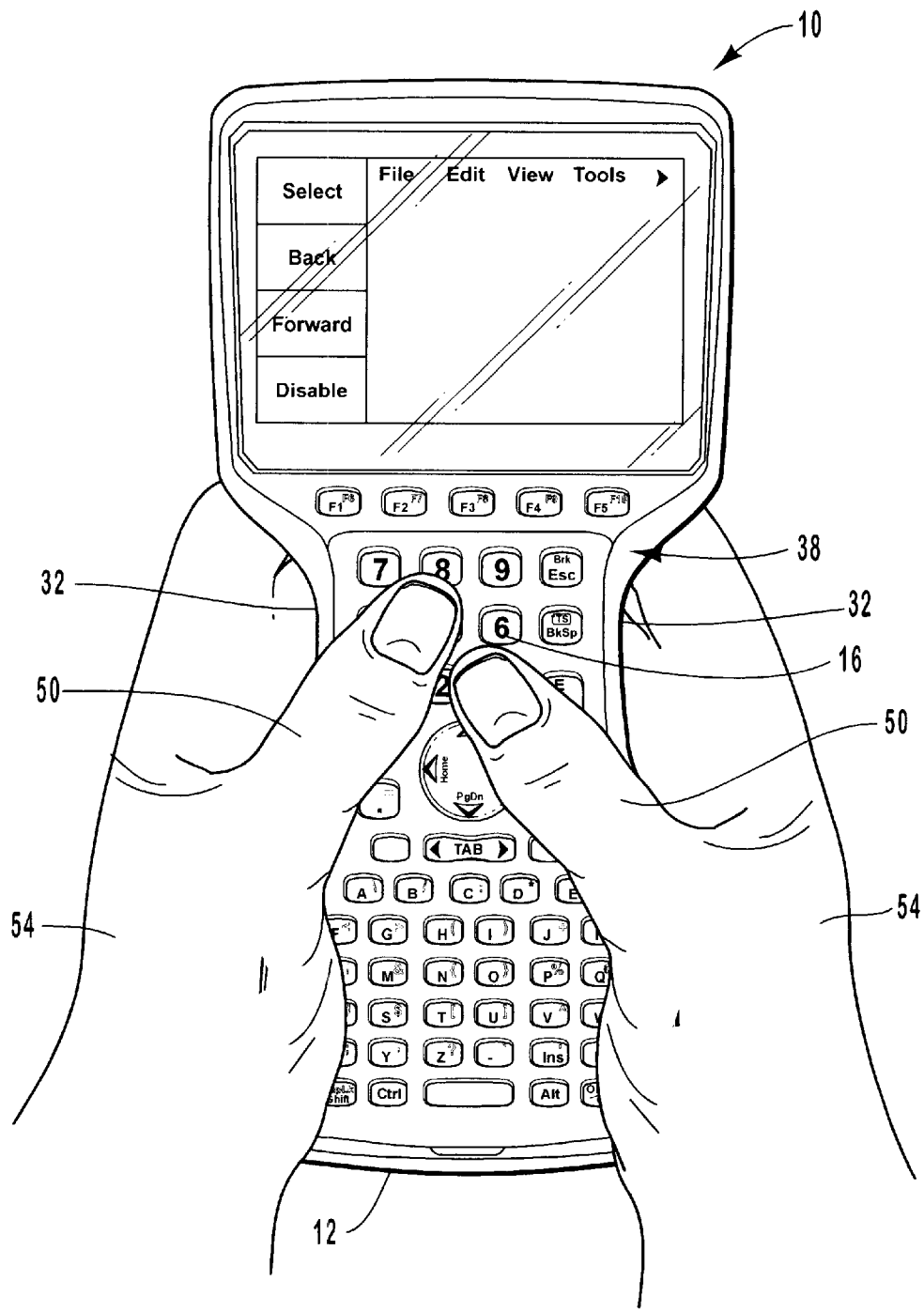
FIG. 3C illustrates a user holding the handheld computer of FIG. 1 using two hands in a third grip.

FIGS. 3A–3C illustrate computer 10 of FIG. 2 being held by a user in three different positions that take advantage of the shape of housing 12. These three positions are not exhaustive of the ways in which a user can hold computer 10, but do illustrate that the user can shift between positions and can select a position according to the particular task that is being performed with computer 10. FIGS. 3A–3C also illustrate other ergonomic features of computer 10.

Turning first to FIG. 3A, the user is grasping the gripping region 38 of housing 12 with one hand, with the upper portion of the palm being positioned on the depression of the back surface. For instance, the depression 34, shown in FIG. 2, can engage the rounded portion of the palm that is opposite the knuckles of the fingers, particularly the index and middle fingers. Positioning this portion of the palm of hand in the depression inhibits slippage of housing 12 with respect to the user's hand.

As further illustrated in FIG. 3A, fingers 52 are wrapped around one lateral surface of gripping region 38 and thumb 50 is wrapped around the other lateral surface. With the hand in this position, the user can view screen 14 and to have the other hand free to enter information into the keypad structure 16 or to engage in other activities.

FIG. 3B illustrates computer 10 being grasped by the user with one hand in another position. In this position, one or more of the fingertips or another portion of the fingers are positioned in the depression on the back surface of housing 12. Positioning the fingertips or another portion of the fingers within the depression in this manner allows the user to firmly grasp computer 10. The center portion of the palm is positioned at lateral surface 32 of gripping portion 38 as illustrated in FIG. 3B, with the thumb of the hand and the nearby portions of the palm being positioned at or near the front surface 20. This position enables the user to have one free hand and to enter data to keypad structure 16 using the free hand or thumb 50 of hand 54.

FIG. 3C illustrates a user grasping computer 10 using two hands. In this position, the fingertips or another portion of one of more fingers of both hands 54 engage the depression on the back surface of housing 12. Portions of the palms of the hands rest on the lateral surfaces 32 of gripping section 38. Both thumbs 50 are positioned on or over keypad structure 16 and are available to depress keys 18 to enter information into computer 10. Using both thumbs 50 enables faster keying of data than is possible using only one thumb 50. This position also allows the user to grasp computer 10 in a highly secure manner while simultaneously enter information into the computer.

The foregoing ergonomic structures can be used with portable electronics devices that have any type of keypad, display device, or expansion ports and, indeed, can be used with portable electronics devices that do not have any or all of these additional features. Thus, the invention can be practiced with or without the other novel structures disclosed hereinafter, including the removable bezel, the touch sensitive screen of the display device, and the expansion port. However, including some or all of these additional novel structures can result in a portable electronics device that can be both held comfortably and conveniently used in adverse environmental conditions. Thus, the description will now proceed to these additional novel features.

2. Removable Bezel

Figure 4:
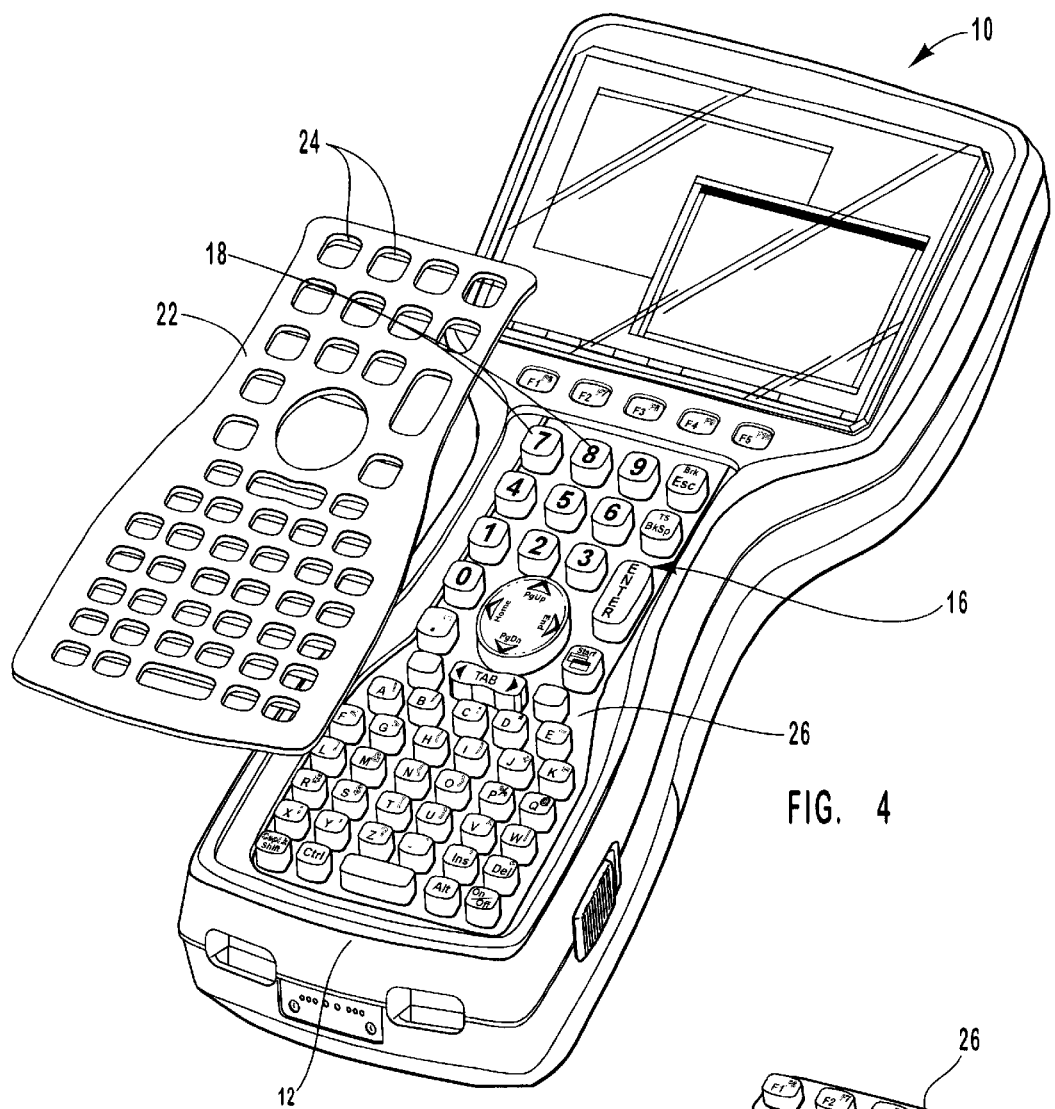
FIG. 4 illustrates the bezel of the handheld computer of FIG. 1 having been removed from the keypad structure to facilitate cleaning of various portions of the computer.

A removable bezel that facilitates the cleaning of the keypad structure of computer 10 of FIG. 1 is illustrated in greater detail in FIG. 4. Bezel 22 is illustrated in FIG. 4 as having been removed from housing 12. When positioned on housing 12, bezel 22 is snap-fitted or otherwise removably attached to front surface 20 of housing 12 generally over keypad structure 16. Bezel 22 has an array of holes 24 that are in registry with the corresponding keys 18 of keypad structure 16, such that when the bezel is positioned on housing 12, the keys 18 extend through the corresponding holes 24. With bezel 22 positioned on housing 12, keys 18 are accessible and keypad structure 16 can be used in a normal manner to input data to computer 10. In the embodiment illustrated in FIG. 4, bezel 22 is a substantially rigid structure formed of a polymeric material or another material that is readily cleaned.

A removable bezel assembly illustrated in FIG. 4 is particularly useful where computer 10 is used in environments where exposure to water, dust, dirt, or other adverse conditions can be expected. Bezel 22 is removable to allow both the front and back surfaces of the bezel to be cleaned when it is exposed to dust, dirt, or other adverse environmental conditions. Moreover, removing bezel 22 from computer 10 allows the keypad structure 16 to be conveniently cleaned.

Figure 5:
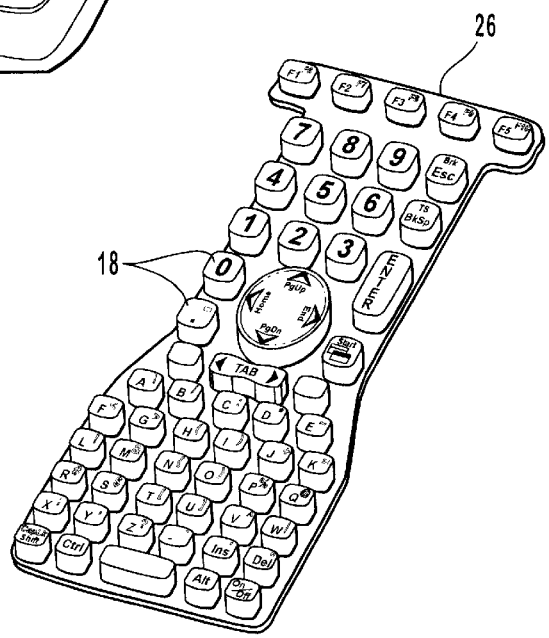
FIG. 5 illustrates a portion of a pliable protective structure that conforms to the keypad structure of the handheld computer.

In this embodiment, keypad structure 16 includes a pliable protective structure 26, shown in both FIGS. 4 and 5, formed from a polymeric material that conforms to keys 18 and to housing 12 in a manner that seals the interior of housing 12 and also presents a surface with relatively few intricacies for cleaning. The periphery of pliable protective structure 26 is sealingly fitted against the inside surface of housing 12 to prevent water or other material from entering the interior of the housing. Moreover, the pliable protective structure 26 provides protection for keys 18 and a substantially non-slip surface for contact with the user's fingers when the user depresses the keys to the keypad structure.

When portable computer 10 is exposed to dirt, dust, or other adverse environmental conditions, the removable bezel 22 is removed to expose pliable protective structure 26. In this manner, keypad structure 16 can be easily wiped clean of any dirt or dust and can remove any foreign material that would otherwise be trapped within the keypad structure of the computer. Moreover, pliable protective structure 26 seals the interior of housing 12 such that water or other cleaning agents do not enter the interior of housing 12 and potentially damage the processing components of computer 10.

3. Touch Sensitive Screen

Figure 6:
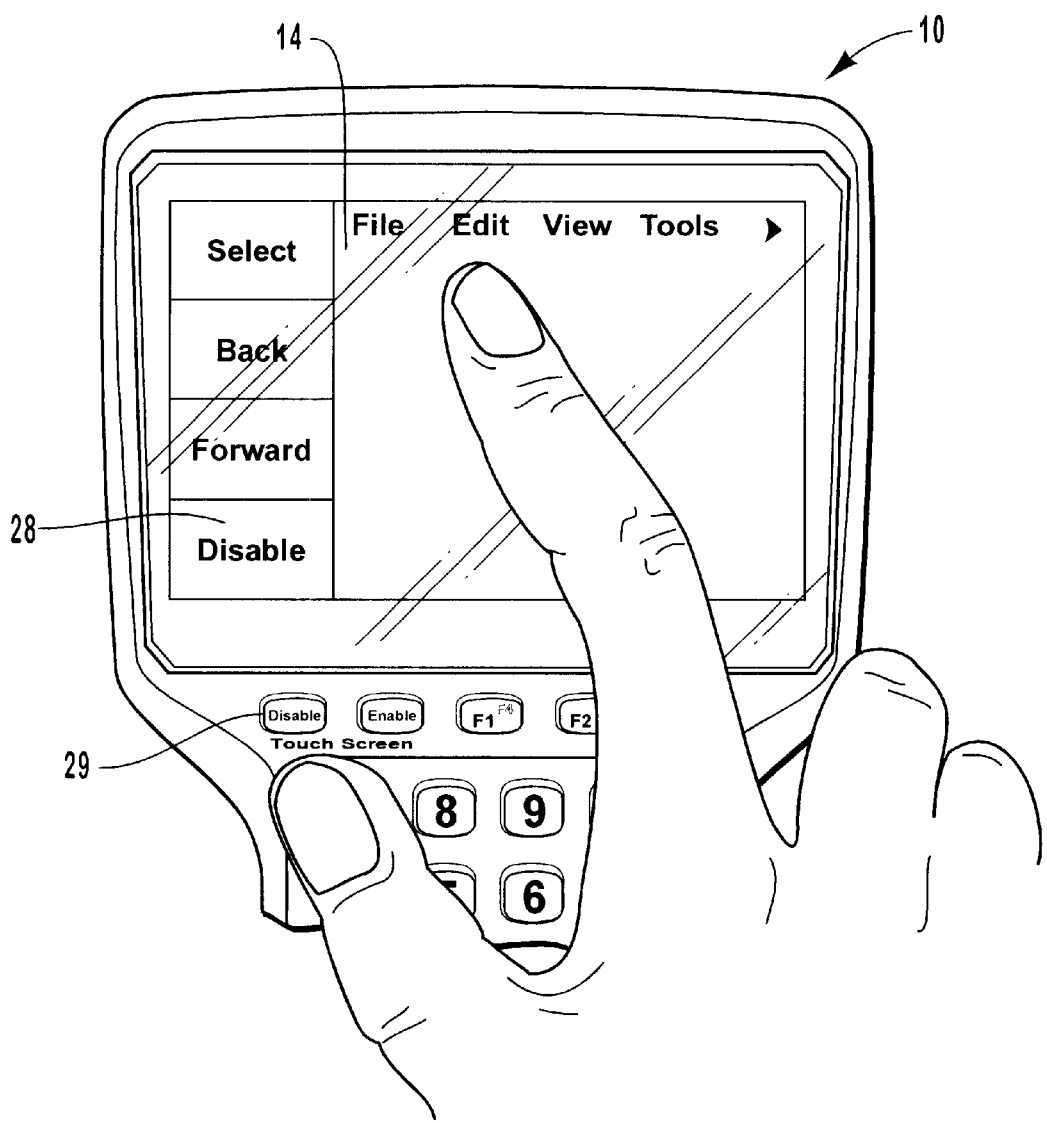
FIG. 6 illustrates a touch sensitive screen associated with the handheld computer, wherein the touch sensitive screen can be selectively disabled to facilitate cleaning of the screen.

FIG. 6 illustrates a touch sensitive screen, the touch sensitivity of which can be selectively disabled to permit the user to clean the touch sensitive screen without causing input to be inadvertently entered to computer 10. Touch sensitive screen 14 can be any desired touch sensitive screen, including those that are currently used in consumer electronics devices. Touch sensitive screen 14 can be used in combination with or in place of a keypad structure. While touch sensitive screens are one of the most intuitive forms of input devices, conventional touch sensitive screens can be cleaned only when the entire electronics device or the entire display device is disabled or powered down.

According to this embodiment, rather than requiring the entire computer 10 or the entire display device to be disabled or powered down, only the touch sensitivity of screen 14 is disabled. Thus, when computer 10 is exposed to dust, dirt, water, or other adverse environmental conditions, and the user wishes to wipe or clean off screen 14, the user can merely disable the touch sensitivity of the screen prior to cleaning. Once the touch sensitivity is disabled, the user can clean the screen 14 using a hand or any object as desired without the risk of applying pressure to screen 14 that would cause input to be inadvertently entered to computer 10. Moreover, because the entire computer 10 or the entire display device is not disabled, the user can continue to view information on screen 14 while the touch sensitivity of the screen is disabled. In this manner, users can find that the screen can be cleaned more quickly and more conveniently than has been possible in conventional devices. After the user has cleaned screen 14 as desired, the touch sensitivity of the screen can be re-enabled so that the screen can again be used as an input device.

Disabling the touch sensitivity of screen 14 can be performed in one of a variety of ways. For instance, touch sensitive screen 14 can include a pressure sensitive region and an associated portion of a displayed image 28 that, when touched, responds by disabling the touch sensitivity. Alternatively, a key 29 located in a keypad structure or any other position on computer 10 can be used to disable the touch sensitivity of screen 14. Those skilled in the art will recognize that there are a variety of structures that can be used to receive input from the user requesting that the touch sensitivity be enabled or disabled.

Computer 10 includes hardware circuitry, software logic, or a combination thereof that responds to input requesting enablement and disablement of the touch sensitivity. For example, a hardware mechanism for disabling the touch sensitivity can cause electrical signals generated by touch sensitive screen 14 to not be generated, can cause the screen to not react to pressure, or can interfere with such electrical signals such that computer 10 fails to respond thereto. Software mechanisms can interfere with the ability of software associated with touch sensitive screen 14 to operate in response to pressure or can cause other software operating on computer 10 (i.e., operating systems, applications) to fail to respond to signals generated by the screen. Those skilled in the art will recognize, upon learning of the disclosure made herein, that other mechanisms and structures for disabling touch sensitivity can be used. Thus, "disabling" touch sensitivity, as used herein, refers to acts associated with causing touch sensitive screen 14 to fail to respond to applied pressure and also refers to acts associated with causing computer 10 to not respond to input signals generated by touch sensitive screen 14.

4. Expansion Port

Figure 7:
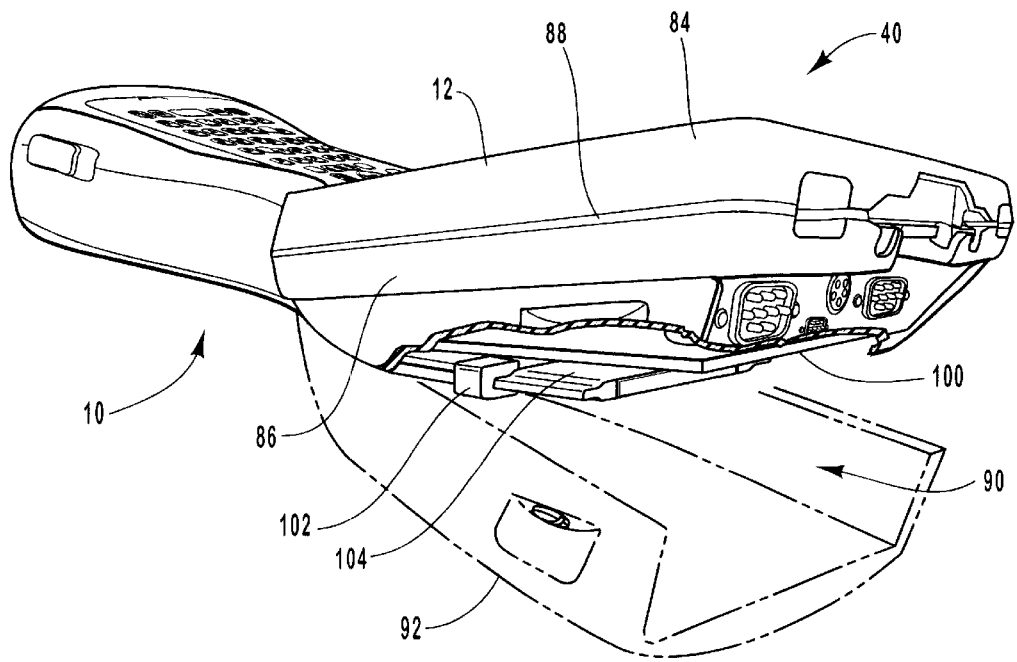
FIG. 7 is a perspective view of the handheld computer of FIG. 1 showing an expansion port in relation to a sealed interface between a front portion and a back portion of the housing.

FIGS. 7 and 8 illustrate one embodiment of computer 10 having an expansion port that accepts expansion cards, peripheral devices, communication devices, or any other structure that currently exists or that will be developed in the future to enhance the capabilities or computer 10. In FIGS. 7 and 8, computer 10 is a rugged portable computer that has features adapted to protecting processing components housed in housing 12 from adverse conditions, dirt, water, dust, etc. Housing 12 is formed from a front portion 84 and a back portion 86 that are connected at or by a gasket or another sealing structure at seal 88. In order to enhance the watertight nature of seal 88, the associated gasket can be formed of a pliable material that conforms to both front portion 84 and back portion 86. As shown in FIGS. 7 and 8, seal 88 and the associated gasket do not lie in a single plane, but are displaced upwards in the portion of seal 88 that is included in the top section 40 of computer 10.

Seal 88 is positioned so that an expansion port, which is shown generally at reference number 90, can be formed in top section 40 without straddling or interfering with the integrity or the operation of seal 88 and the associated gasket or other sealing structure. In this embodiment, expansion port 90 is positioned within back portion 86 of housing 12 and behind seal 88. Expansion port 90 is exposed when door 92 is opened (as shown by the phantom lines), thereby allowing an expansion device to be inserted into expansion port 90.

Positioning seal 88 and expansion port 90 in the manner depicted in FIGS. 7 and 8 allows computer 10 to be a rugged, substantially watertight computer that can be used in a variety of environmental conditions without being damaged. Moreover, seal 88 and the associated gasket can be relatively simple compared to that which would be necessary if expansion port 90 were to be aligned with, straddle, or interfere with the gasket.

While the location of the expansion port is shown generally at reference number 90, a specific example of hardware associated with an expansion port is illustrated in FIG. 7, which depicts a user-accessible PC card slot 102 and a card 104 having been inserted therein. Card 104 can be mass data storage, an input/output device, or any other expansion device that enhances the capabilities of computer 10, thereby enabling computer 10 to take advantage of any of a variety existing or future technologies. For instance, computer 10 can be fitted with a global positioning system receiver, a laser bar code scanner, telecommunication devices, or any other such devices.

It should be appreciated that as computer 10 is fitted with various hardware components that the shape and size of door 92 can be modified accordingly to accommodate the storage and configuration requirements of the various hardware components. By modifying the design of door 92, expansion port 90 is likewise modified, enabling various expansion devices to be inserted into expansion port 90 without affecting the watertight nature of seal 88. It should also be appreciated that door 92 can be configured so as to be selectively removable and replaceable with alternative embodiments of door 92 in order to accommodate the various storage space requirements of current and future expansion device technologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A handheld electronics device having ergonomic features that assist a user who holds the electronics device, the electronics device comprising:
   a housing that is narrower at a middle gripping region than at a top section and a bottom section at either side of the gripping region, the housing having:
   a front surface;
   a back surface;
   lateral surfaces;
   rounded corners where the lateral surfaces meet the back surface; and
   a longitudinal depression formed in the back surface, the depression having a peripheral edge distant from the lateral surfaces and is substantially at a midline of the back surface, the depression being adapted for engaging a portion of a hand of the user when the user holds the electronics device.

2. A handheld electronics device as recited in claim 1, further comprising a keypad structure positioned on the front surface at the middle gripping region.

3. A handheld electronics device as recited in claim 2, wherein the keypad structure is positioned on the front surface such that a force applied to depress a key of the keypad structure is directed generally toward the depression.

4. A handheld electronics device as recited in claim 2, further comprising a display device positioned in the top section of the housing.

5. A handheld electronics device as recited in claim 4, wherein a screen of the display device is angularly displaced such that the plane defined by the screen is not parallel to the plane defined by the keypad structure.

6. A handheld electronics device as recited in claim 1, wherein the gripping portion and the depression together enable the user to hold the handheld electronics device while alternating between:
   a first grip using one hand, with an upper portion of the palm of the one hand being positioned on the depression, one or more fingers of the one hand being wrapped from the back surface to one adjacent lateral surface, and the thumb of the one hand being wrapped from the back surface to the other adjacent lateral surface;
   a second grip using one hand, with one or more fingers of the one hand being positioned on the depression, a center portion of the palm being positioned at an adjacent lateral surface, and the thumb and associated portions of the palm being positioned at or near the front surface; and
   a third grip using two hands positioned opposite one another, with fingers of each hand being positioned on the depression of the back surface, portions of the palms resting on the lateral surfaces, and both thumbs being available to access the front surface.

7. A handheld electronics device as recited in claim 1, wherein the housing houses a computer.

8. A handheld electronics device as recited in claim 1, wherein the housing further has rounded corners where the lateral surfaces meet the front surface.

9. A handheld electronics device having ergonomic features that assist a user who holds the electronics device, the electronics device comprising:
   a housing that is narrower at a middle gripping region than at a top section and a bottom section at either side of the gripping region, the housing having:
   a front surface;
   a back surface;
   lateral surfaces;
   rounded corners where the lateral surfaces meet the back surface and where the lateral surfaces meet the front surface;
   a longitudinal depression formed in the back surface, the depression having a peripheral edge distant from the lateral surfaces and is substantially at a midline of the back surface, the depression being adapted for engaging a portion of a hand of the user when the user holds the electronics device;
   a keypad structure positioned on the front surface at the middle gripping region; and
   a screen of a display device positioned at the top section.

10. A handheld electronics device as recited in claim 9, wherein:
   the keypad structure defines a first line that is normal to the keypad structure and extends away from the keypad structure; and
   the screen defines a second line that is normal to the screen and extends away from the screen, wherein the first line and the second line intersect.

11. A handheld electronics device as recited in claim 9, wherein the depression has a generally oblong shape having a major axis parallel to the longitudinal axis of the housing.

12. A handheld electronics device as recited in claim 9, wherein the housing houses a computer.

13. A handheld electronics device as recited in claim 9, wherein the front surface comprises a removable bezel that can be removed to expose the keypad structure and enable the keypad structure to be cleaned.

14. A handheld electronics device as recited in claim 9, wherein:
   the screen is a touch sensitive screen; and
   the touch sensitivity of the screen can be selectively disabled without disabling the display device to enable the display device to be cleaned without causing the screen to react to pressure applied during cleaning.

15. A handheld computer having ergonomic features that assist a user who holds the computer, the computer comprising:
   a housing that is narrower at a middle gripping region than at a top section and a bottom section at either side of the gripping region, the housing having:
   a front surface;
   a back surface;
   lateral surfaces;
   rounded corners where the lateral surfaces meet the back surface;
   a longitudinal depression formed in the back surface, the depression having a peripheral edge distant from the lateral surfaces and is substantially at a midline of the back surface for engaging a portion of a hand of the user when the user holds the electronics device, the longitudinal depression having a generally oblong shape having a major axis parallel to the longitudinal axis of the housing;

a keypad structure positioned on the front surface at the middle gripping region such that a force applied to depress a key of the keypad structure is directed generally toward the longitudinal depression, the keypad structure defining a first line that is normal to the keypad structure and extends away from the keypad structure; and a screen of a display device positioned at the top section, the screen defining a second line that is normal to the screen and extends away from the screen, wherein the first line and the second line intersect.

16. A handheld computer as recited in claim 15, wherein the housing further has rounded corners where the lateral surfaces meet the front surface.

17. A handheld electronics device having ergonomic features that assist a user who holds the electronics device and that further has features that assist the user in cleaning the electronics device, the electronics device comprising:

a housing that is narrower at a middle gripping region than at a top section and a bottom section at either side of the gripping region, the housing having:
a front surface;
a back surface;
lateral surfaces;
rounded corners where the lateral surfaces meet the back surface;
a depression formed in the back surface substantially at a midline of the back surface for engaging a portion of a hand of the user when the user holds the electronics device;
a keypad structure positioned on the front surface at the middle gripping region, the keypad structure defining a first line that is normal to the keypad structure and extends away from the keypad structure;
a touch sensitive screen of a display device positioned at the top section, wherein the touch sensitivity of the screen can be selectively disabled without disabling the display device to enable the display device to be cleaned without causing the screen to react to pressure applied during cleaning, the touch sensitive screen defining a second line that is normal to the touch sensitive screen and extends away from the touch sensitive screen, wherein the first line and the second line intersect; and
a selectively removable bezel positioned over the keypad structure, the bezel having openings through which keys of the keypad structure extend when the bezel is positioned over the keypad structure, the bezel being removable to expose the keypad structure and enable the keypad structure to be cleaned.

* * * * *